United States Patent
Chang

(10) Patent No.: US 9,744,609 B2
(45) Date of Patent: Aug. 29, 2017

(54) ELECTROCHEMICAL MACHINING DEVICE

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 364 days.

(21) Appl. No.: 14/496,496

(22) Filed: Sep. 25, 2014

(65) Prior Publication Data

US 2015/0122636 A1    May 7, 2015

(30) Foreign Application Priority Data

Nov. 6, 2013   (CN) .......................... 2013 1 0541441

(51) Int. Cl.
  *B23H 3/00* (2006.01)
  *B23H 3/04* (2006.01)
(52) U.S. Cl.
  CPC .................. *B23H 3/04* (2013.01); *B23H 3/00* (2013.01)
(58) Field of Classification Search
  CPC ... B23H 3/00; B23H 3/04; B23H 5/02; B23H 5/06; B23H 5/10; B23H 7/26; B23H 7/28; B23H 7/30; B23H 7/32
  See application file for complete search history.

(56) References Cited

U.S. PATENT DOCUMENTS

| | | | | |
|---|---|---|---|---|
| 3,235,475 A | * | 2/1966 | Williams | B23H 3/04 204/222 |
| 3,271,281 A | * | 9/1966 | Brown | B23H 3/04 204/224 M |
| 3,288,698 A | * | 11/1966 | Bruns | B23H 9/14 204/224 M |
| 3,372,099 A | * | 3/1968 | Clifford | B23H 3/04 148/277 |
| 3,536,603 A | * | 10/1970 | Bonga | B23H 11/006 204/224 R |

FOREIGN PATENT DOCUMENTS

WO          9736708 A1    10/1997

\* cited by examiner

*Primary Examiner* — Ciel Thomas
(74) *Attorney, Agent, or Firm* — Steven Reiss

(57) ABSTRACT

An electrochemical machining device includes an electrode bundle, an electrode sleeve used for receiving the electrode bundle therein, and an electrolytic tank. The electrode bundle includes a number of columnar electrodes. Each of the columnar electrodes can move along an axial direction of the electrode sleeve. The electrode sleeve includes sidewalls, and two pressing plates positioned corresponding to two adjacent sidewalls. The sidewalls of the electrode sleeve include a number of screws to adjust a distance between the pressing plates and the corresponding sidewalls. The pressing plates can be moved to press the electrode bundle, and fix the electrode bundle between the pressing plates and the corresponding sidewalls of the electrode sleeve. A shape of the electrode bundle can be adjusted according to a shape of a molding surface.

20 Claims, 9 Drawing Sheets

ELECTROCHEMICAL MACHINING DEVICE

FIELD

The subject matter herein generally relates to the field of electrochemical machining, and in particular to an electrode used for electrochemical machining.

BACKGROUND

Electrochemical machining (ECM) is a method of removing metal by an electrochemical process. It is normally used for mass production of materials that are difficult to machine by conventional methods. The work-piece forms the anode and the electrode forms the cathode.

BRIEF DESCRIPTION OF THE DRAWINGS

Implementations of the present technology will now be described, by way of example only, with reference to the attached figures.

DETAILED DESCRIPTION

Figure 1:
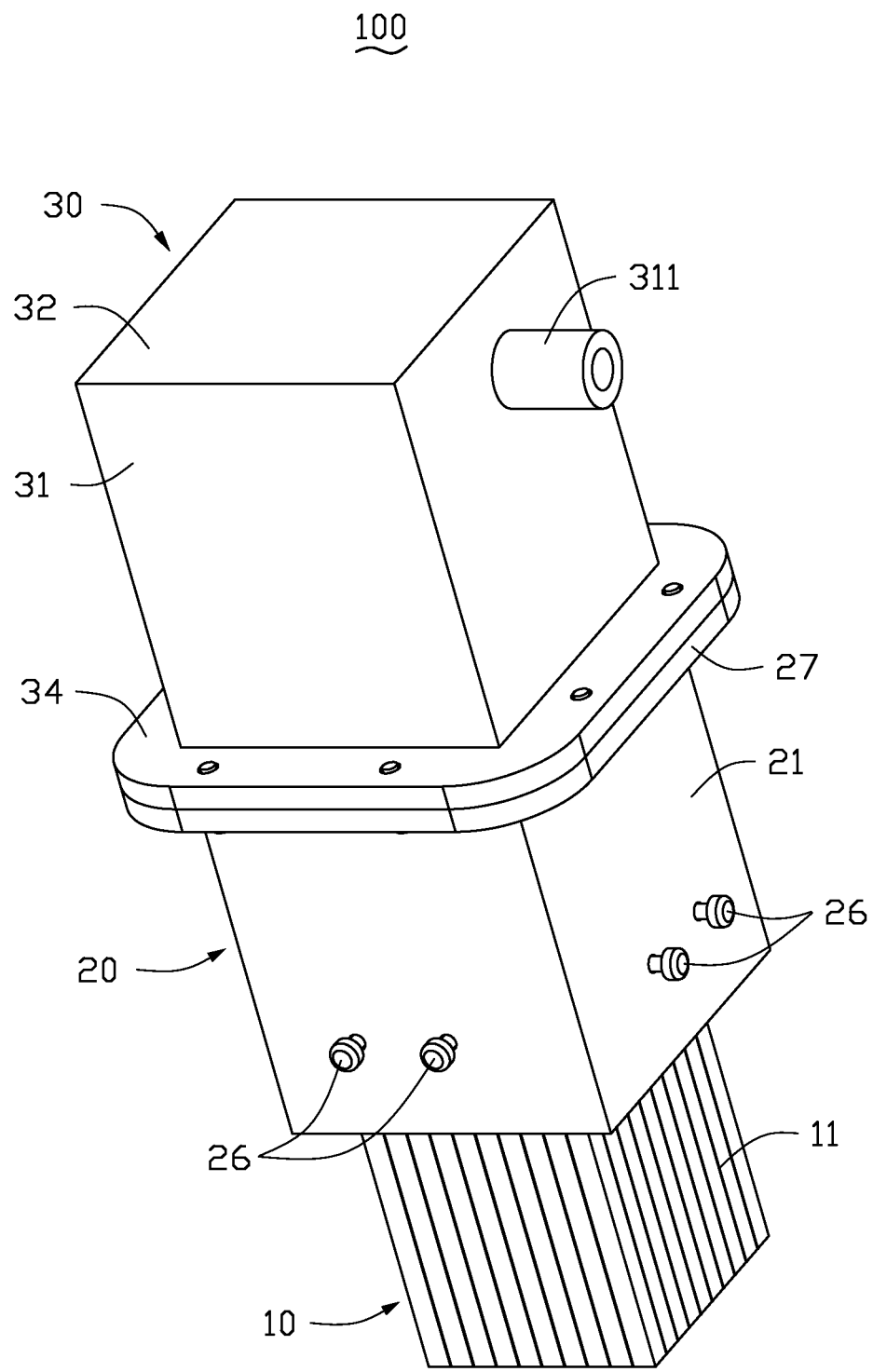
FIG. 1 is an isometric view of an embodiment of an electrochemical machining device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates an embodiment of an electrochemical machining device 100. The electrochemical machining device 100 can include an electrode bundle 10, an electrode sleeve 20, and an electrolytic tank 30. One end portion of the electrode bundle 10 can be received in the electrode sleeve 20. The electrolytic tank 30 can be connected to the electrode sleeve 20.

Figure 2:
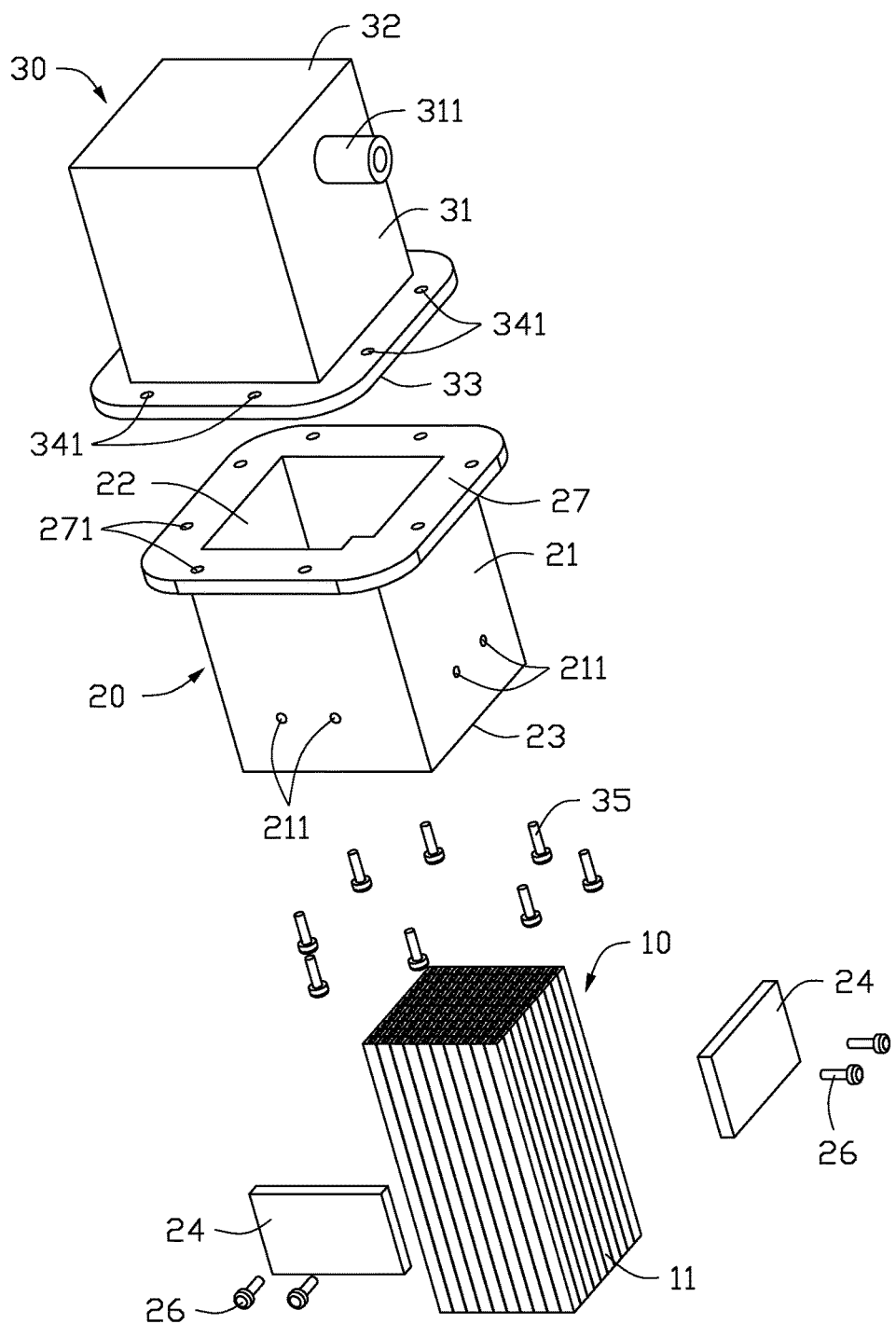
FIG. 2 is an exploded, isometric view of the electrochemical machining device as shown in FIG. 1.

FIG. 2 illustrates that the electrode bundle 10 can include a plurality of columnar electrodes 11. An insulating layer can be coated on an outer surface of each columnar electrode 11 to insulate the columnar electrodes 11 from each other during an electrochemical machining process. A quantity and size of the columnar electrodes 11 can be changed according to requirements. Each of the columnar electrodes 11 can be substantially solid or substantially hollow. In at least one embodiment, each of the columnar electrodes 11 can be hollow to allow insoluble substances to flow through during the electrochemical machining process.

The electrode sleeve 20 can be a substantially hollow tubular structure. The electrode sleeve 20 can include four sidewalls 21, an upper end portion 22, a lower end portion 23, and two pressing plates 24. In other embodiments, the two pressing plates 24 can combine to form an "L"-shaped plate. The electrode sleeve 20 can define a through hole (not labeled) through the upper portion 22 and the lower portion 23. An end portion of the electrode bundle 10 can insert through the through hole of the electrode sleeve 20 from the lower end portion 23 to be received in the electrode sleeve 20. The two pressing plates 24 can be positioned corresponding to two adjacent sidewalls 21. Each of the two adjacent sidewalls 21 can define at least one threaded hole 211. A plurality of screws 26 can insert into the two adjacent sidewalls 21 through the corresponding threaded holes 211. A substantially ring-shaped first boss 27 can surround the upper end portion 22. The first boss 27 can define a plurality of threaded holes 271.

The electrolytic tank 30 can be substantially hollow. The electrolytic tank 30 can include four sidewalls 31, and a top plate 32 connected to one end portion of the four sidewalls 31. The other end portion of the four sidewalls 31 can define an opening 33. One of the four sidewalls 31 can define a liquid inlet 311. A substantially ring-shaped second boss 34 can surround the other end portion of the four sidewalls 31. The second boss 34 can define a plurality of threaded holes 341. A plurality of screws 35 can insert through the threaded holes 271 and the threaded holes 341 to connect the electrode sleeve 20 to the electrolytic tank 30.

An electrolyte can flow into the electrolytic tank 30 through the liquid inlet 311. The electrolyte can flow from the electrolytic tank 30 to the columnar electrodes 11 in the electrode sleeve 20, and further flow through the columnar electrodes 11 to a surface of a work-piece to be processed.

Figure 3:
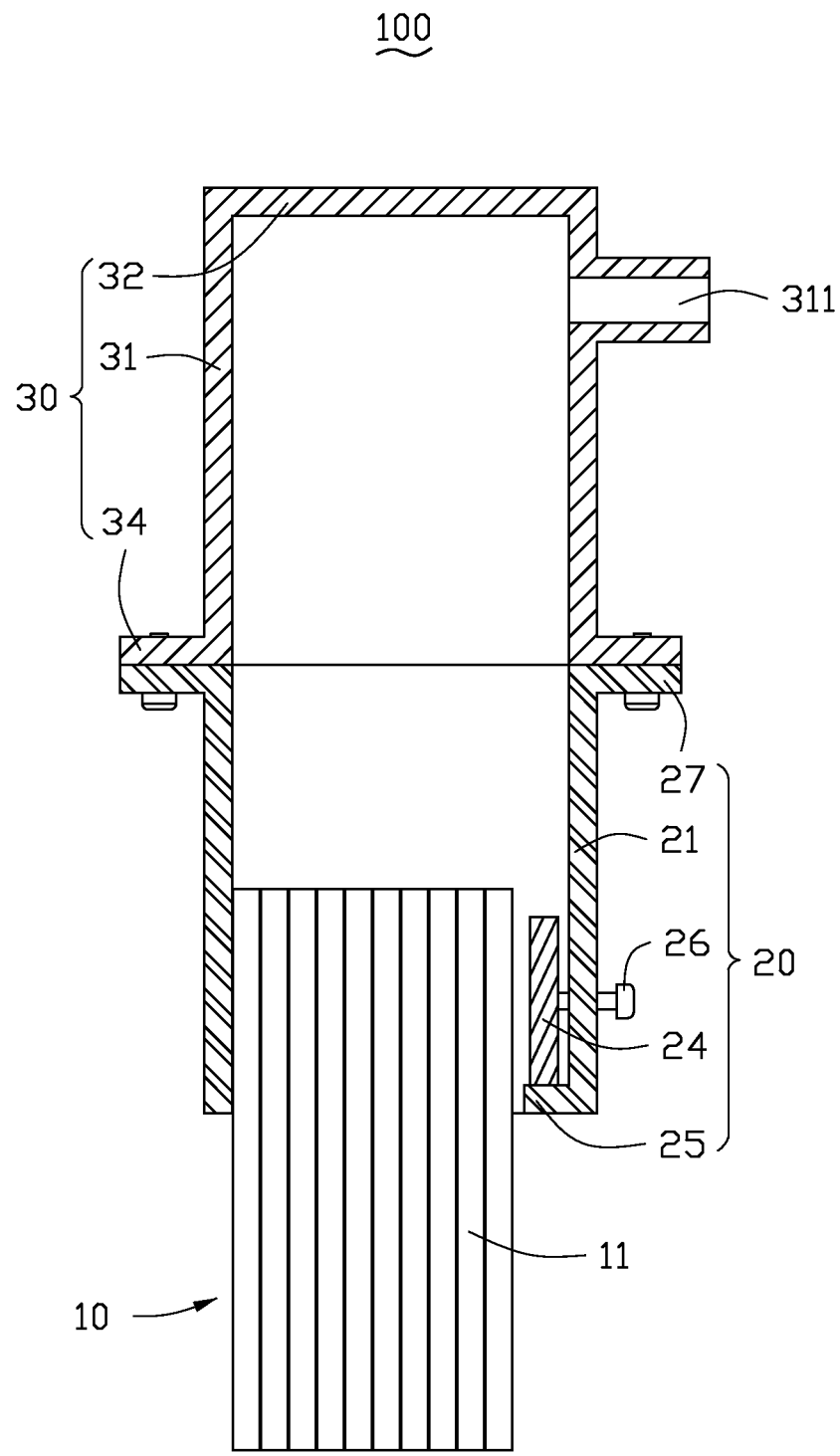
FIG. 3 is a cross-sectional view of the electrochemical machining device as shown in FIG. 1.

FIG. 3 illustrates that a joint portion of the two adjacent sidewalls 21 and the lower end portion 23 (see FIG. 2) can include a bearing plate 25 extending toward an inside of the electrode sleeve 20. The bearing plate 25 can be used to position the pressing plates 24 inside the electrode sleeve 20. The two pressing plates 24 can be used to fix the electrode bundle 10 inside the electrode sleeve 20. The screws 26 can screw through the corresponding threaded holes 211, and end portions of the screws 26 can be fixed to the corresponding pressing plates 24. The screws 26 can be screwed to adjust a distance between the pressing plates 24 and the corresponding sidewalls 21. Thus, the pressing plates 24 can be moved to press the electrode bundle 10, and a pressing force of the two pressing plates 24 on the electrode bundle 10 can be adjusted to fix the electrode bundle 10 between the pressing plates 24 and the corresponding sidewalls 21 of the electrode sleeve 20.

Figure 4:
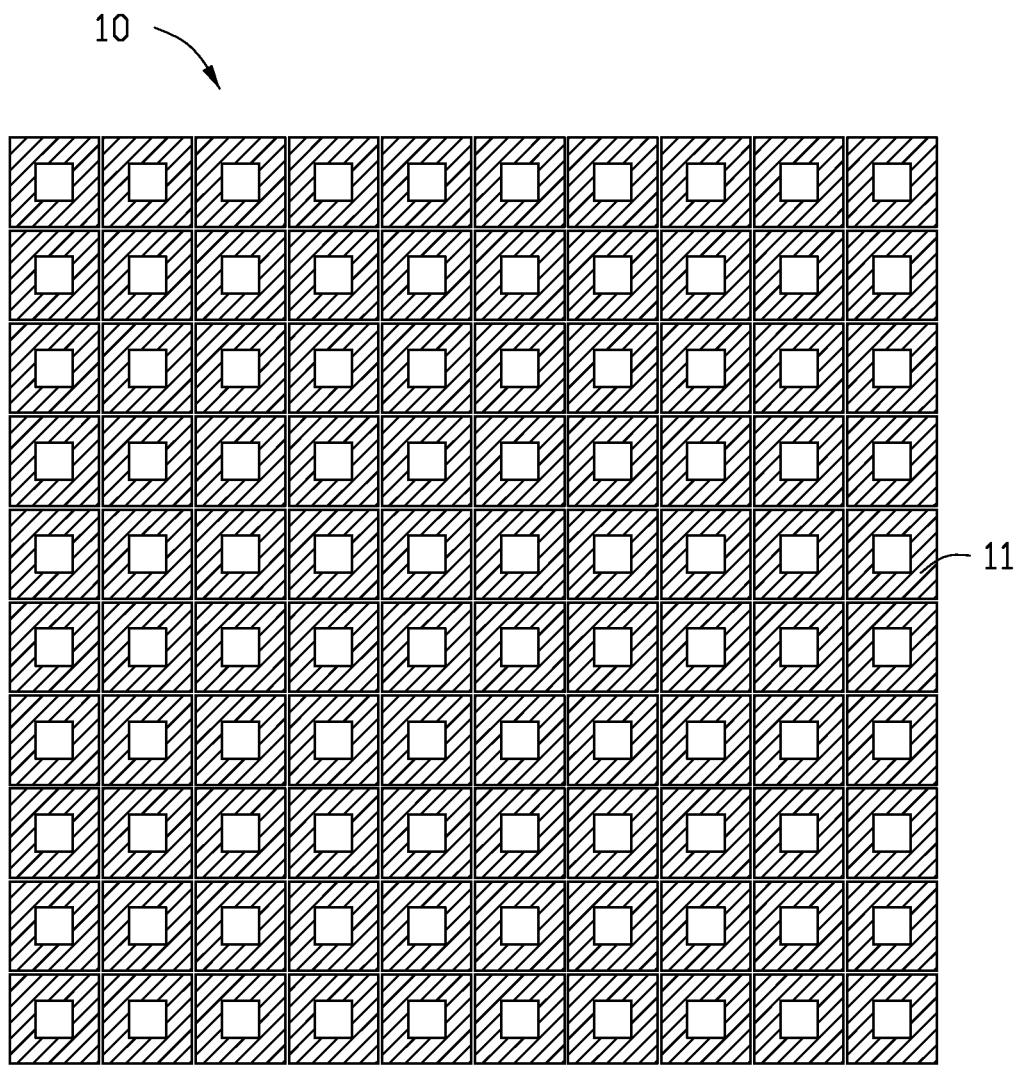
FIG. 4 is a cross-sectional view of an electrode bundle of the electrochemical machining device as shown in FIG. 1.

FIG. 4 illustrates that a cross-section of each columnar electrode 11 can be substantially rectangular. In other embodiments, the cross-section of the columnar electrodes 11 can be substantially triangular, hexagonal, or other shapes.

Figure 5:
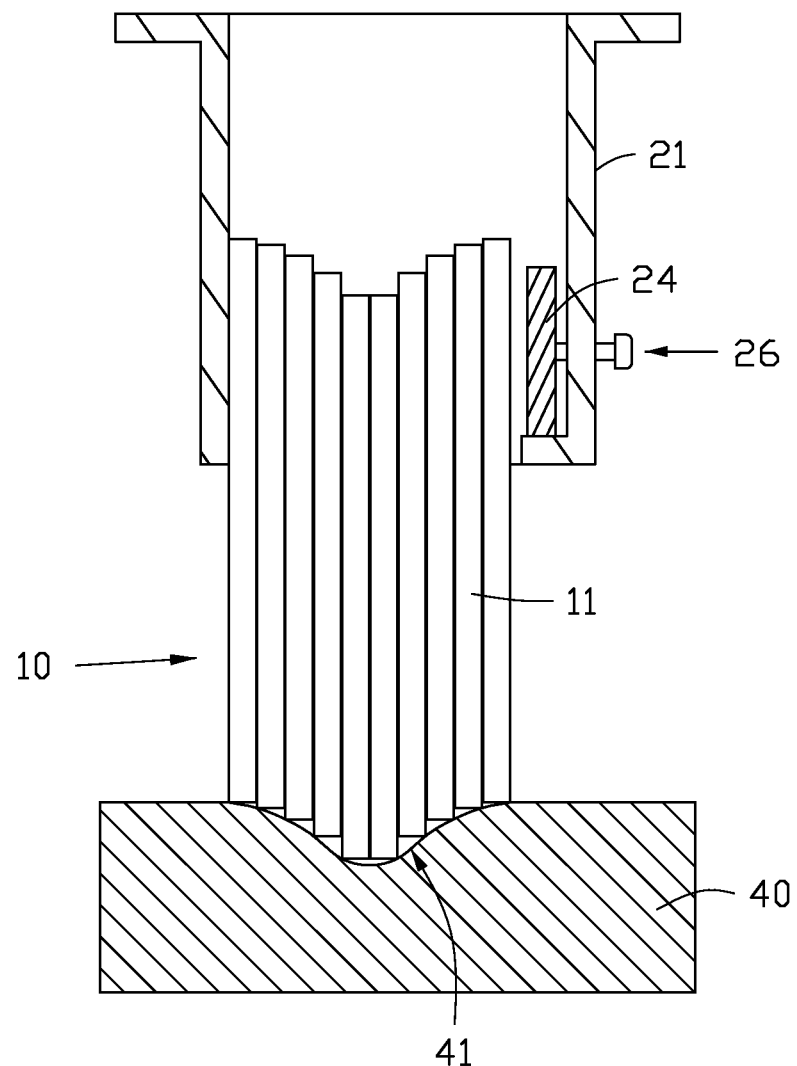
FIG. 5 is a diagrammatic view of the electrode bundle being set in the electrochemical machining device.

FIG. 5 illustrates that after the electrode bundle 10 is inserted into the electrode sleeve 20, a sample 40 for adjusting an arrangement of the columnar electrodes 11 can be positioned under the lower end portion 23 of the electrode sleeve 20. The sample 40 can include a molding surface 41. A contour of the molding surface 41 can match a contour of a surface of a work-piece to be processed. The screws 26 can be screwed to move the pressing plates 24 away from the electrode bundle 10, thereby allowing the columnar electrodes 11 to drop onto the molding surface 41. Thus, the columnar electrodes 11 are arranged according to the contour of the molding surface 41. After the columnar electrodes 11 are arranged, the screws 26 can be screwed to move the two pressing plates 24 toward the electrode bundle 10, until the pressing plates 24 pressingly fix the electrode bundle 10 against the corresponding sidewalls 21. Then, the electrochemical machining device 100 can process a work-piece. A shape of the electrode bundle 10 can be easily changed.

Figure 6:
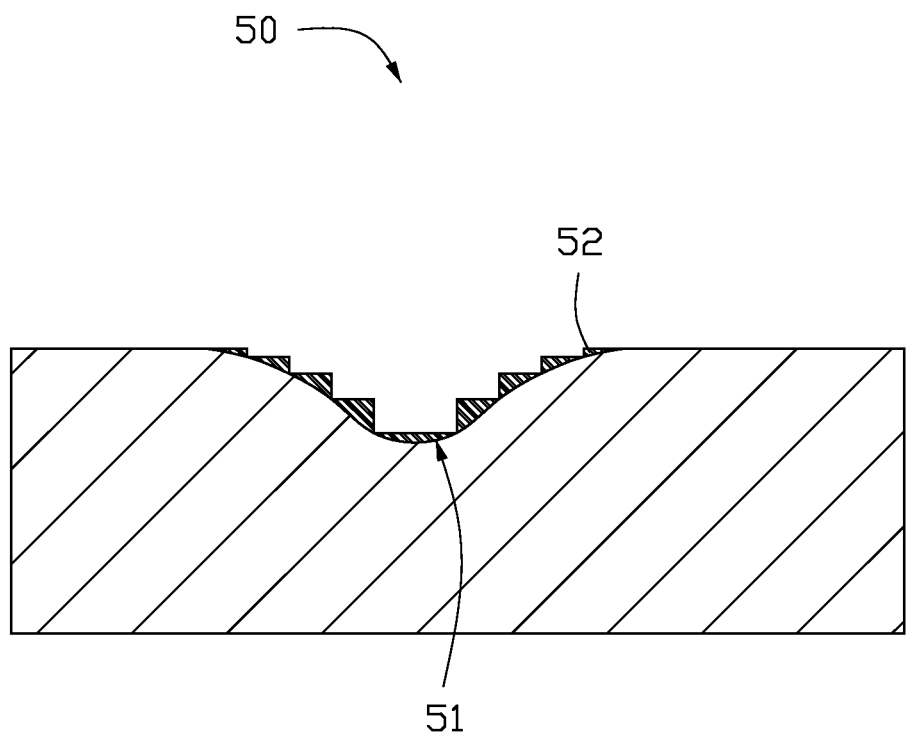
FIG. 6 is a cross-sectional view of the work-piece that has been processed by the electrochemical machining device.

FIG. 6 illustrates that a processed work-piece 50 includes a molded surface 51 matching the contour of the molding surface 41 (see FIG. 5), and a stepped surface 52 matching a contour of the electrode bundle 10 after the columnar electrodes 11 are arranged. The stepped surface 52 can undergo a secondary processing. An amount of material removed from the processed work-piece 50 by the secondary processing can be less than 10% of a total amount of material removed from the work-piece 50 by the first processing.

Figure 7:
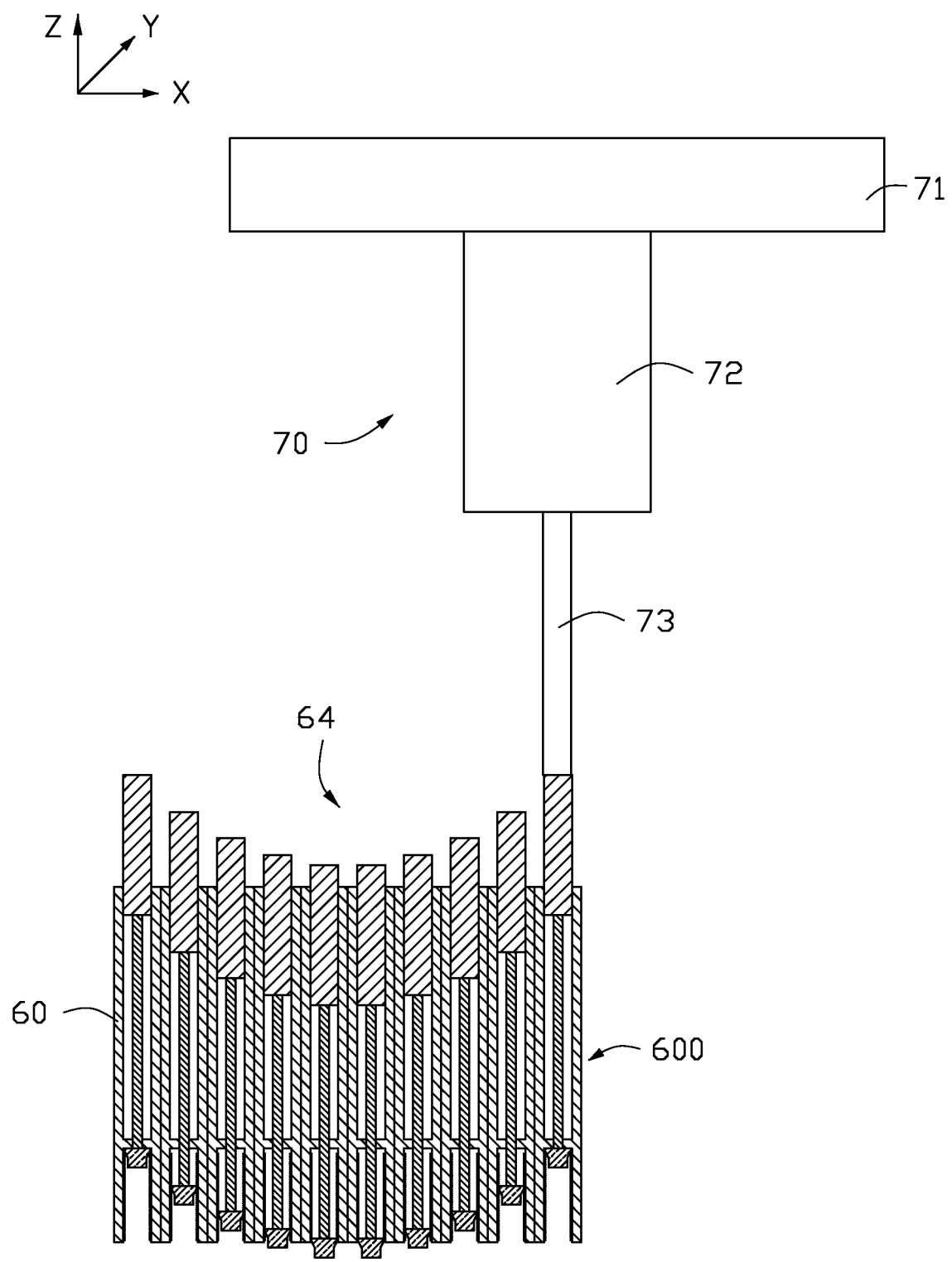
FIG. 7 is a diagrammatic view of an embodiment of a shape-setting fixture being set.

FIG. 7 illustrates that a shape-setting fixture 600 can be used to arrange the columnar electrodes 11 of the electrode bundle 10 when the sample 40 is not available. The shape-setting fixture 600 can include a plurality of adjustable components 60. The adjustable components 60 can be arranged side-by-side, and each adjustable component 60 can be moved along an axial direction thereof.

A ternate-directional adjusting machine 70 can include an XY-directional platform 71 and a Z-directional feed mechanism 72. The XY-directional platform 71 can move along an XY-axis of a three-dimensional coordinate system, and the Z-directional feed mechanism 72 can move along a Z-axis of the three-dimensional coordinate system. A push rod 73 can extend from the Z-directional feed mechanism 72 along the Z-axis. The push rod 73 can move along the XY-axis by being driven by the XY-directional platform 71, and move along the Z-axis by being driven by the Z-directional feed mechanism 72.

The ternate-directional adjusting machine 70 can be used to set a shape of the shape-setting fixture 600. Movement parameters of the ternate-directional adjusting machine 70 can be set according to a desired shape of the shape-setting fixture 600. The push rod 73 can be moved to the individual adjustable components 60 by the XY-directional platform 71. The push rod 73 can be moved to set a position of each of the adjustable components 60 by the Z-directional feed mechanism 72. Thus, an upper surface 64 of the shape-setting fixture 600 can match a desired contour of a surface of a work-piece to be processed.

Figure 8:
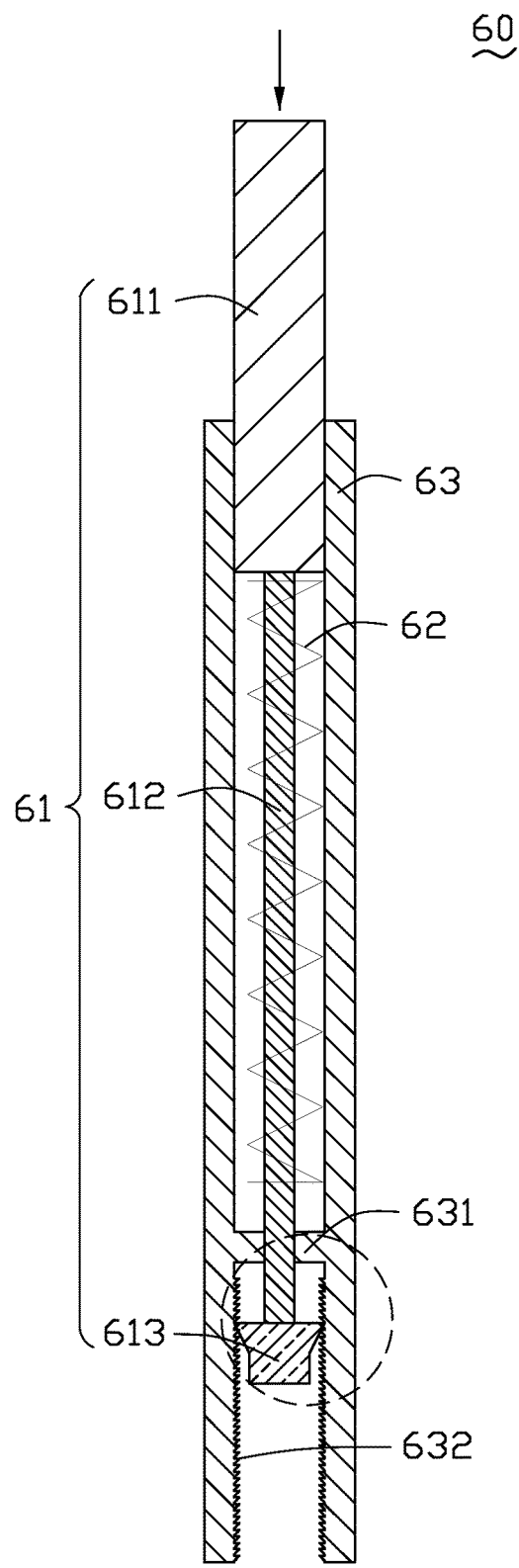
FIG. 8 is a cross-sectional view of an adjustable component of the shape-setting fixture as shown in FIG. 7.

FIG. 8 illustrates that each of the adjustable components 60 can include a support rod 61, an elastic member 62, and a sleeve 63. The support rod 61 can include a back end portion 611, a linking rod 612, and a front end portion 613. The sleeve 63 can be substantially hollow and substantially cylindrical. The sleeve 63 can include a fastening portion 631. The fastening portion 631 can divide an interior space of the sleeve 63 into a first portion and a second portion. The back end portion 611 can insert through the first portion. The fastening portion 631 can define a through hole (not labeled). The linking rod 612 can be connected to the back end portion 611 and extend through the through hole of the fastening portion 631. The front end portion 613 can be received in the second portion of the sleeve 63 and be connected to the linking rod 612. The back end portion 611 can be substantially cylindrical, and the diameter of the back end portion 611 can be substantially the same as the inner diameter of the sleeve 63. The diameter of the linking rod 612 can be less than the diameter of the back end portion 611. A size of the through hole in the fastening portion 631 can be smaller than a size of the front end portion 613. An inner surface of the second portion of the sleeve 63 can include a saw-tooth portion 632 which includes a plurality of saw-teeth. The elastic member 62 can be sleeved on the linking rod 612 and positioned between the back end portion 611 and the fastening portion 631. The back end portion 611 can be pressed along an axial direction of the support rod 61 to move the linking rod 612 through the through hole of the fastening portion 631, thereby compressing the elastic member 62. The front end portion 613 can be held in place by the saw-tooth portion 632. The elastic member 62 can be restored to move the linking rod 612 back to an original position by loosening the saw-tooth portion 632.

Figure 9:
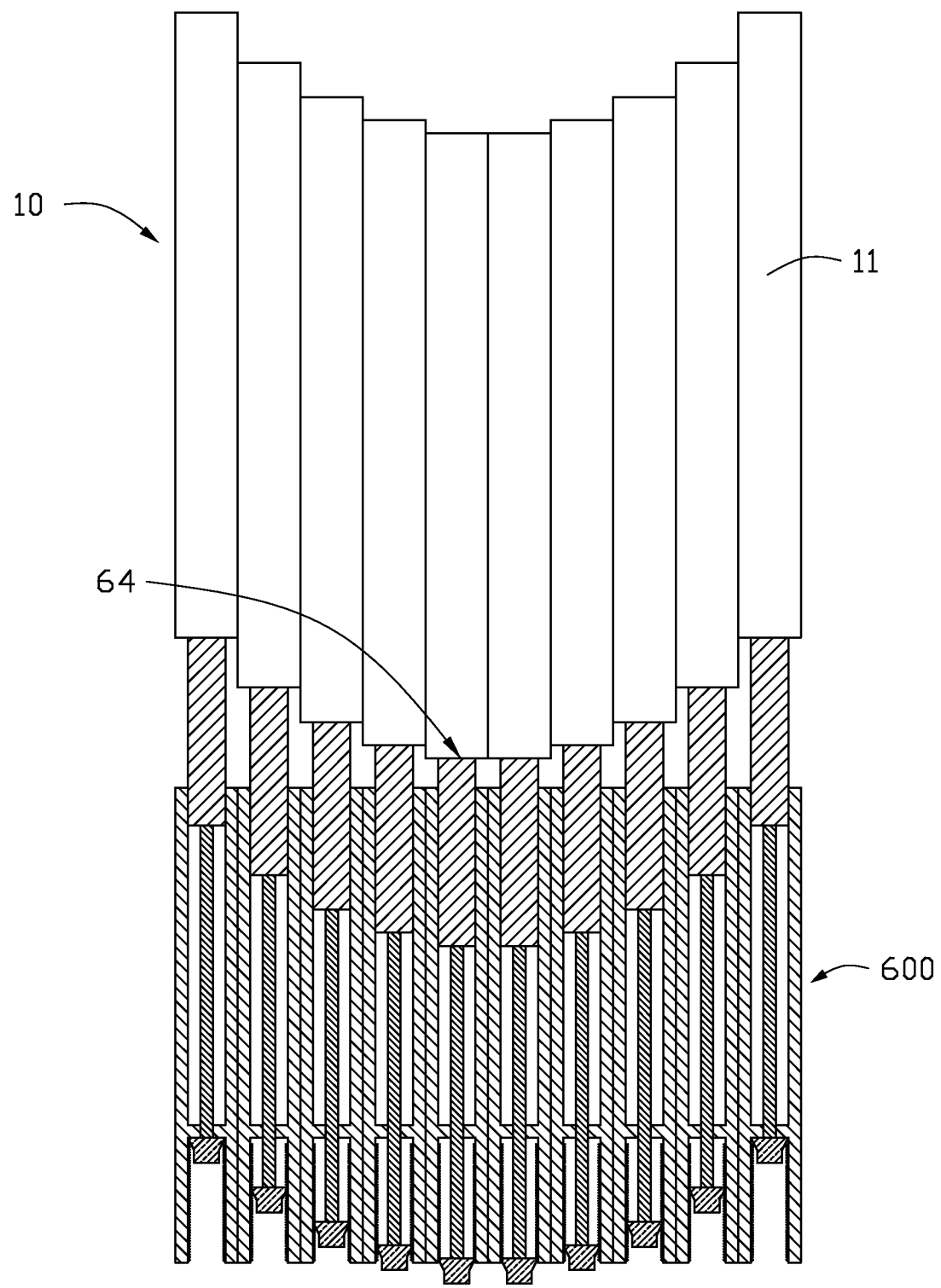
FIG. 9 is a schematic view of the electrode bundle being set by the shape-setting fixture.

FIG. 9 illustrates that the columnar electrodes 11 can be positioned on the upper surface 64 of the shape-setting fixture 600. Then, each of the columnar electrodes 11 can be fixed in position by the two pressing plates 24 (see FIG. 3). Thus, a contour of the electrode bundle 10 can match a contour of the upper surface 64 of the shape-setting fixture 600.

The embodiments shown and described above are only examples. Many details are often found in the art such as the other features of an electrochemical machining device 100. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electrochemical machining device comprising:
   an electrolytic tank;
   an electrode sleeve coupled to the electrolytic tank and comprising a plurality of sidewalls and a plurality of pressing plates positioned to the plurality of sidewalls respectively, wherein the plurality of sidewalls defines a plurality of holes, each configured to receive one of a plurality of screws which are fixed to the plurality of pressing plates and configured to adjust a distance between the plurality of pressing plates and the plurality of sidewalls; and an electrode bundle received in the electrode sleeve and comprising a plurality of columnar electrodes;

wherein the plurality of pressing plates is moved to abut the electrode bundle by the plurality of screws;

wherein the plurality of pressing plates is configured to press against the electrode bundle, and a pressing force of the plurality of pressing plates on the electrode bundle is adjustable to fix the electrode bundle between the plurality of pressing plates and the plurality of sidewalls of the electrode sleeve.

2. The electrochemical machining device of claim 1, wherein the plurality of columnar electrodes is solid or hollow.

3. The electrochemical machining device of claim 1, wherein a cross-section of the plurality of columnar electrodes is rectangular, triangular, hexagonal, or other shapes.

4. The electrochemical machining device of claim 1, wherein a surface of the plurality of columnar electrodes is coated with an insulating layer.

5. The electrochemical machining device of claim 1, wherein the plurality of pressing plates is combined to form an "L"-shaped plate.

6. The electrochemical machining device of claim 1, wherein the electrode sleeve is hollow tubular shaped, and further comprises an upper end portion and a lower end portion, the upper end portion is connected to the electrolytic tank, the electrode bundle inserts into the electrode sleeve through the lower end portion.

7. The electrochemical machining device of claim 6, wherein a joint portion of two adjacent sidewalls of the plurality of sidewalls and the lower end portion comprises a bearing plate, and the plurality of pressing plates is positioned on the bearing plate.

8. The electrochemical machining device of claim 6, wherein a ring-shaped first boss surrounds the upper end portion, and the first boss defines a plurality of threaded holes.

9. The electrochemical machining device of claim 1, wherein the electrolytic tank comprises a top plate connected to one end portion of the electrolytic tank, and an opening defined in the other end portion of the electrolytic tank.

10. The electrochemical machining device of claim 9, wherein one of the plurality of sidewalls is defined by a liquid inlet.

11. The electrochemical machining device of claim 9, wherein a ring-shaped second boss surrounds the opening, and the second boss defines a plurality of threaded holes.

12. The electrochemical machining device of claim 1, wherein the electrochemical machining device further comprises a shape-setting fixture, and the shape-setting fixture comprises a plurality of adjustable components.

13. The electrochemical machining device of claim 12, wherein each of the plurality of adjustable components comprises a sleeve, a support rod fixed in the sleeve, and an elastic member between the sleeve and the support rod.

14. The electrochemical machining device of claim 13, wherein
the support rod comprises a back end portion, a linking rod, and a front end portion;
a diameter of the back end portion is same as an inner diameter of the sleeve;
a diameter of the linking rod is less than a diameter of the back end portion, and the elastic member is sleeved on the linking rod.

15. The electrochemical machining device of claim 14, wherein the sleeve comprises a fastening portion, and the support rod is elastically fixed in the sleeve through a coordination of the fastening portion and the elastic member.

16. The electrochemical machining device of claim 15, wherein
an inner surface of the sleeve under the fastening portion comprises a saw-tooth portion, and the saw-tooth portion is a series of continuous saw-teeth;
the front end portion is held in place by the saw-tooth portion.

17. An electrochemical machining device comprising:
an electrolytic tank;
an electrode sleeve coupled to the electrolytic tank and comprising a plurality of sidewalls and a plurality of pressing plates positioned to the plurality of sidewalls respectively, wherein the plurality of sidewalls defines a plurality of holes, each configured to receive one of a plurality of screws which are fixed to the plurality of pressing plates and configured to adjust a distance between the plurality of pressing plates and the plurality of sidewalls; and
an electrode bundle received in the electrode sleeve and comprising a plurality of columnar electrodes;
a shape-setting fixture comprising a plurality of adjustable components, wherein each of the plurality of adjustable components comprises a sleeve, a support rod fixed in the sleeve, and an elastic member between the sleeve and the support rod;
wherein the plurality of pressing plates is configured to press against the electrode bundle, and a pressing force of the plurality of pressing plates on the electrode bundle is adjustable to fix the electrode bundle between the plurality of pressing plates and the plurality of sidewalls of the electrode sleeve.

18. The electrochemical machining device of claim 17, wherein
the support rod comprises a back end portion, a linking rod, and a front end portion;
a diameter of the back end portion is same as an inner diameter of the sleeve;
a diameter of the linking rod is less than a diameter of the back end portion, and the elastic member is sleeved on the linking rod.

19. The electrochemical machining device of claim 18, wherein the sleeve comprises a fastening portion, and the support rod is elastically fixed in the sleeve through a coordination of the fastening portion and the elastic member.

20. The electrochemical machining device of claim 19, wherein
an inner surface of the sleeve under the fastening portion comprises a saw-tooth portion, and the saw-tooth portion is a series of continuous saw-teeth;
the front end portion is held in place by the saw-tooth portion.

* * * * *